(No Model.)  4 Sheets—Sheet 1.
W. E. TAFT.
WHEEL CULTIVATOR.
No. 426,221.  Patented Apr. 22, 1890.
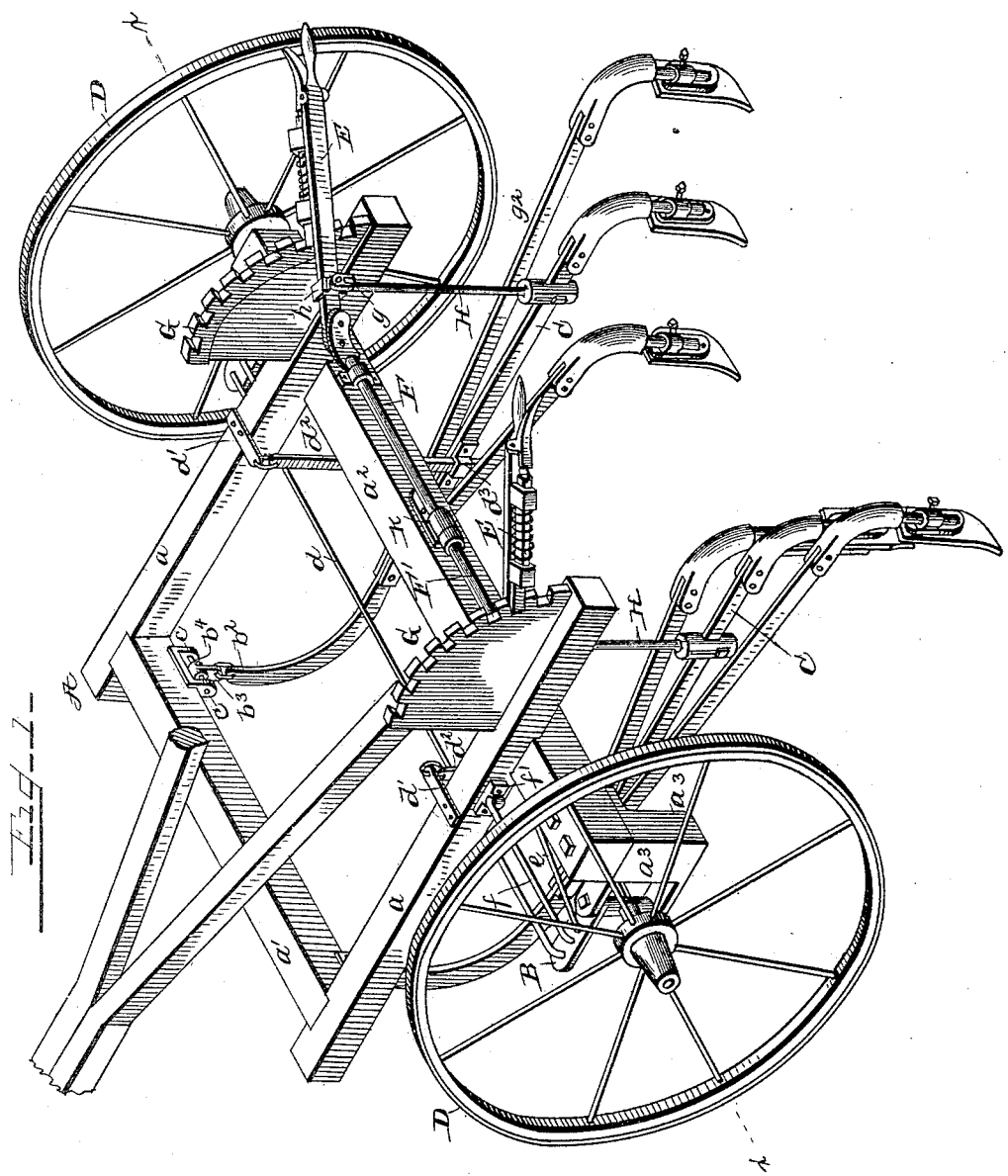
Witnesses
J. A. Tauberschmidt.
L. P. Whitaker.
Inventor
Walter E. Taft.
By Attorney (No Model.) 4 Sheets—Sheet 2.
W. E. TAFT.
WHEEL CULTIVATOR.
No. 426,221. Patented Apr. 22, 1890.
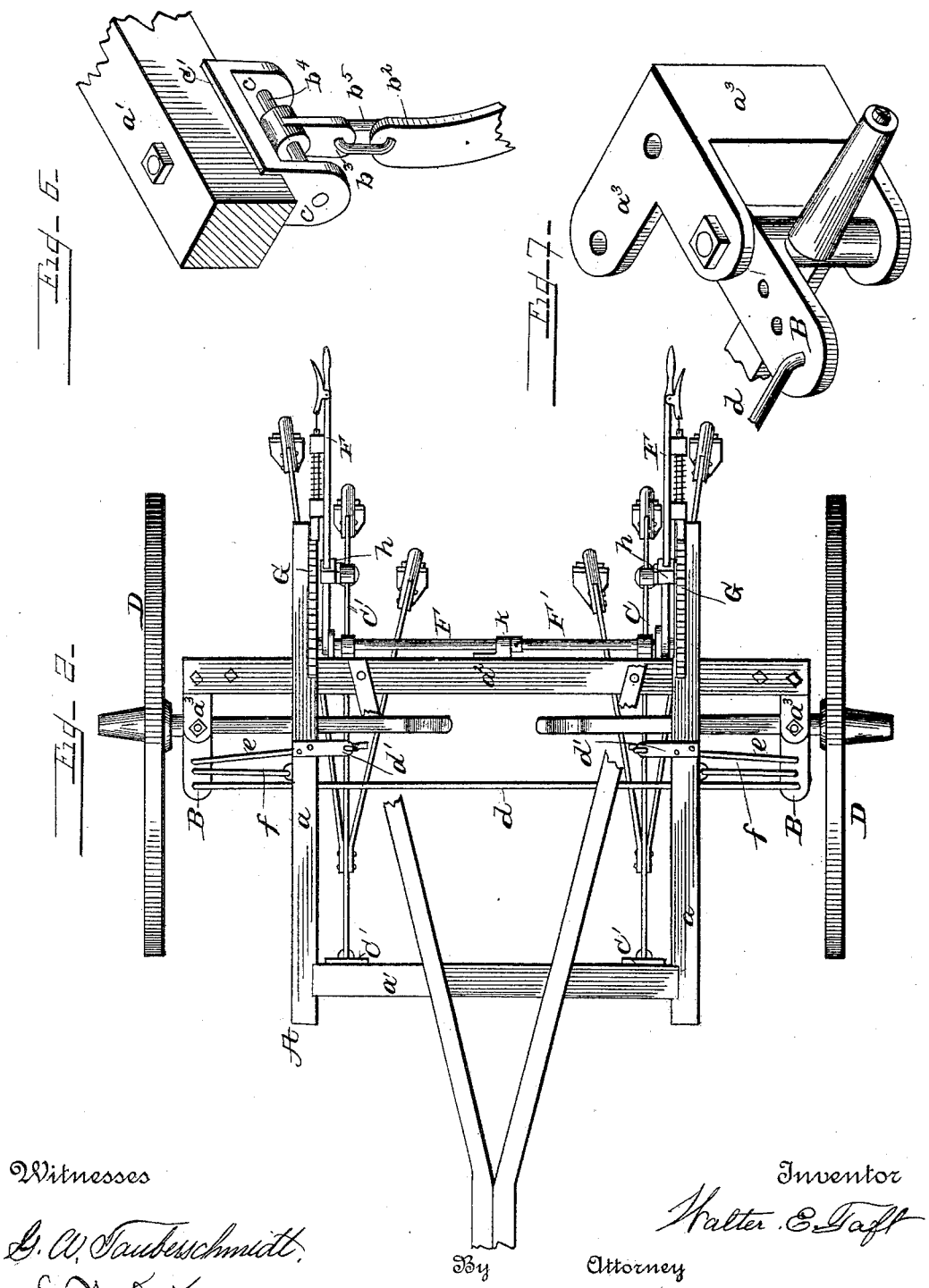
Witnesses
G. A. Taubenschmidt,
L. B. Whitaker.
Inventor
Walter E. Taft
By Attorney (No Model.) 4 Sheets—Sheet 3.
W. E. TAFT.
WHEEL CULTIVATOR.
No. 426,221. Patented Apr. 22, 1890.
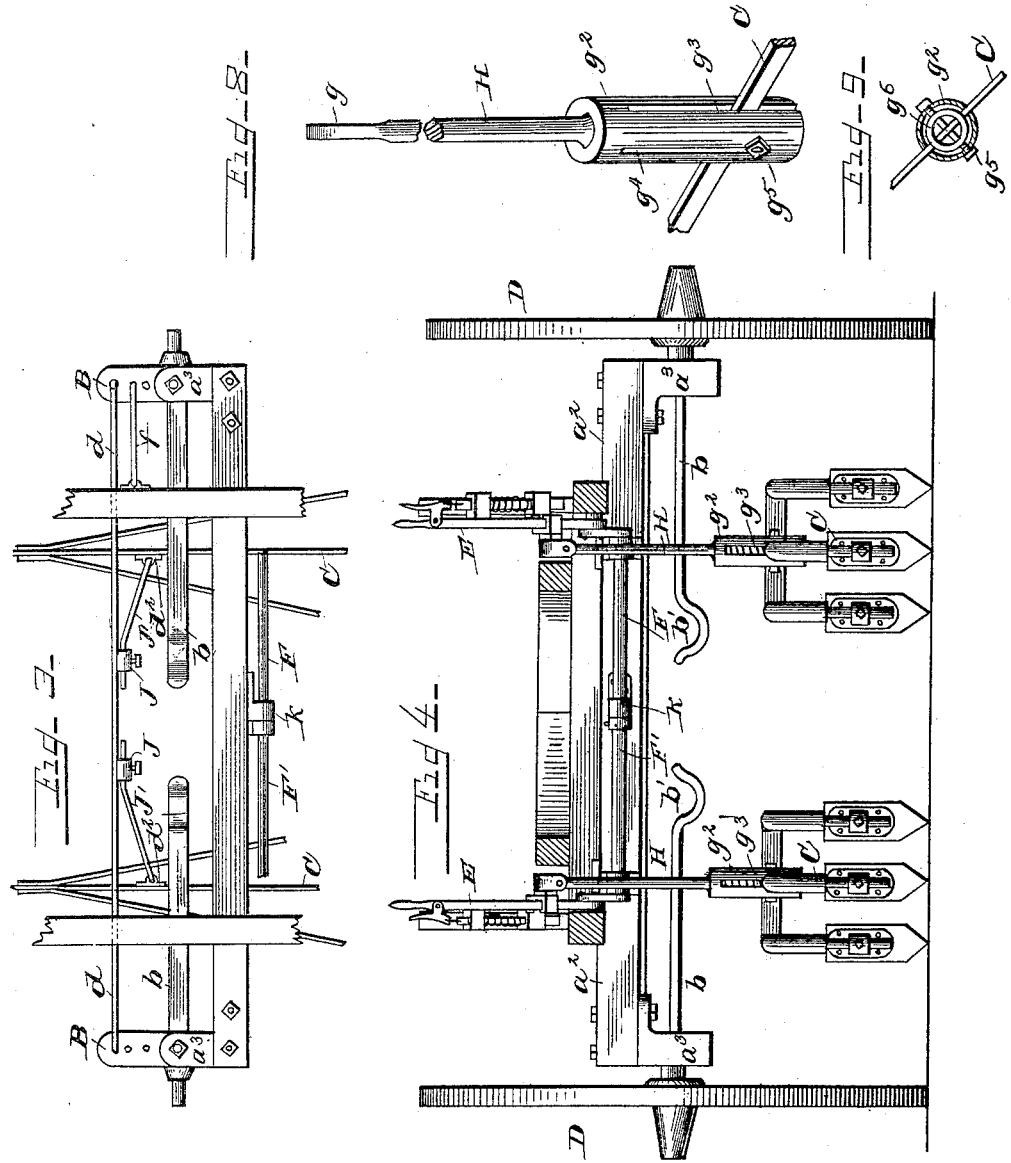

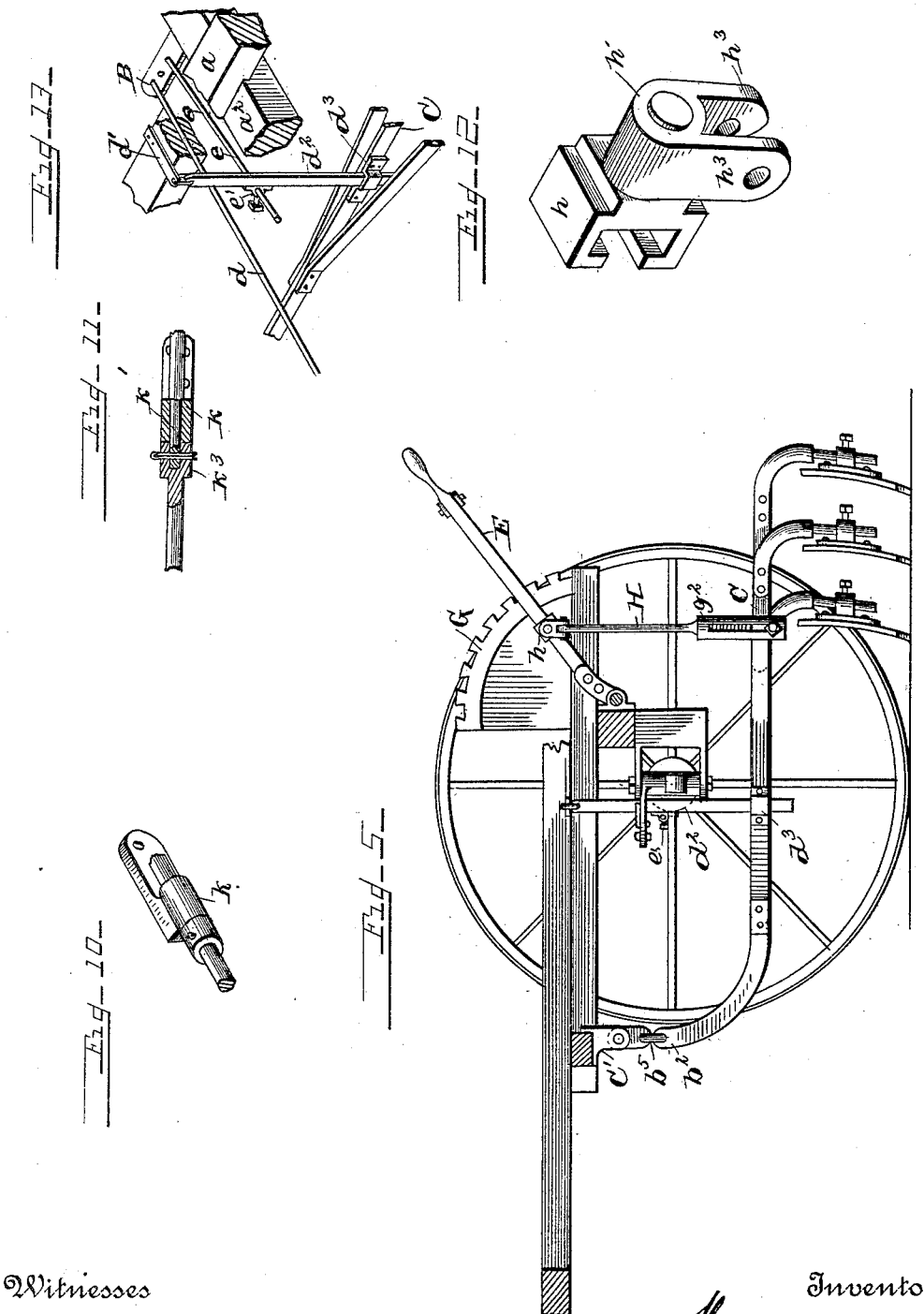

UNITED STATES PATENT OFFICE.

WALTER E. TAFT, OF PROVIDENCE, RHODE ISLAND.

WHEEL-CULTIVATOR.

SPECIFICATION forming part of Letters Patent No. 426,221, dated April 22, 1890.

Application filed March 11, 1890. Serial No. 343,570. (No model.)

*To all whom it may concern:*

Be it known that I, WALTER E. TAFT, a citizen of the United States, residing at Providence, in the county of Providence and State of Rhode Island, have invented certain new and useful Improvements in Wheel-Cultivators; and I do hereby declare the following to be a full, clear, and exact description of the invention, such as will enable others skilled in the art to which it appertains to make and use the same.

My invention pertains to certain new and useful improvements in wheel-cultivators, having for its object the provision of simple and highly-efficient means for readily and easily operating the drag-bars or shovel-beams in the desired manner and for holding the same securely in position.

The invention therefore comprises the details of construction, combination, and arrangement of parts substantially pointed out in the claims.

In the accompanying drawings, Figure 1 is a view in perspective of my invention. Fig. 2 is a plan view thereof. Fig. 3 is a sectional plan view on the line $x\ x$, showing a modification of my improvement. Fig. 4 is a rear end view. Fig. 5 is a longitudinal sectional elevation. Figs. 6, 7, 8, 9, 10, 11, 12, and 13 are detail views.

Referring to the drawings, A designates the cultivator-frame, composed, preferably, of two side bars $a\ a$ and front and rear bars $a'\ a^2$.

To the under side of the rear cross-bar $a^2$ are connected hanger-plates $a^3\ a^3$, wherein are pivotally secured short axles $b\ b$, upon the outer ends of which are secured the carrying-wheels. To each of these pivoted axles are secured the rear ends of outwardly-projecting arms B B, which, in connection with said axles, constitute levers for changing the direction of the movement of the carrying-wheels.

C C designate the center drag-bars or shovel-beams of each series thereof, and the forward ends $b^2$ of each of said central drag-bars C have a link connecting into downwardly-projecting ears $b^3$, which are loosely connected to bracket or plate $c'$ in such a manner as to move laterally that the forward ends of the drag-bars may move to be in line with the shovels as they are spread apart or moved together, said brackets or plates $c'$ being fastened to main frame A on forward cross-bar $a'$.

To the outwardly-projecting arms B B a rod $d$ is connected, whereby the wheels D D are caused to move parallel with each other.

To the main frame there is attached a bracket $d'$ (or other suitable device) for attaching loosely a perpendicular rod $d^2$, said rod passing through a loop $d^3$ on the drag-bars C C in such a manner that the drag-bars may be raised or lowered without hinderance from the rods $d^2$.

To the outwardly-projecting arms B B a rod $e$ connects to rod $d^2$ and passes through a loop $e'$ on rod $d^2$, said loop having a set or thumb screw therein to hold the rod $d^2$ in the lateral position to which it is placed, whereby the drag-bars are moved together or apart from one another, and at the same time causing the drag-bars to move in the direction of the wheels as they are turned.

To the outwardly-projecting arms B B a rod $f$ is connected, with ends bent at right angles, one end fastened into the outwardly projecting arms B B and the other end to slip into a bracket or loop $f'$ on main frame for the purpose of locking the wheels in a parallel position to each other and in line with the draft.

E E are the lifting-levers; G G, the rack or quadrant for locking the levers into at any desired height, the rods H H having a looped end $g$, the lower ends being a hollow cylinder $g^2$, with a slot $g^3$, open at their lower end, and so arranged as to slide over the drag-bars C, allowing drag-bars to slide up and down in said slot, and having slots $g^4$ in sides of cylinder $g^2$, and closed at their lower ends, with a bolt $g^5$ passing through said slots $g^4$ and through drag-bars C, and said cylinder $g^2$ containing a coil-spring $g^6$ therein, the lower end of said spring resting on drag-bar C and its upper end resting against the top of cylinder $g^2$ for the purpose of causing an elastic adjustment downward to the drag-bars that they may adjust themselves to uneven ground, the rods H H being connected to the lifting-levers E E by a bracket $h$, fastened on lifting-levers E E, and said bracket having a swivel $h^2$, fastened to said bracket, said swivel having downwardly-projecting ears $h^3$, the loop $g$ of rod H fastened therein, and said bracket, swivel, and loop so arranged that the rod H may swing in laterally different directions, the levers E E being connected to independent rocker-shafts F F′ at their outer ends of said shafts, and said shafts have a central bearing $k$ in the center of main frame A on rear cross-bar $a^2$, the end of rock-shaft F at $k'$ passing through bearing $k$ and forming a bearing for rock-shaft F′ at $k^3$, the rock-shafts F and F′ having holes through their ends at K′ K² to receive a pin or key for the purpose of locking them together and forming a continuous shaft that the drag-bars may be raised or lowered by either single lifting-lever E E, suitable means being employed whereby either lever may be disengaged from the racks G G.

Fig. 3 shows a modification for connecting the drag-bars with the pivoted axles, substantially as follows: On the rod $d$ at a suitable distance from each end are placed brackets or loops J J, fastened to rod $d$ with set-screws, said brackets J J having a hole through them for rods J′ J′ to move laterally therein and fastened with a thumb-screw after being set at the desired point, said rods J′ J′ being connected to rods $d^2$ for the purpose of separating or moving together the drag-bars and causing the drag-bars to move in the direction of the wheels, the said rod $d$ connecting the pivoted axles with each other.

I am aware that prior to my invention wheel-cultivators have been made with separately-pivoted axles connected together by a rod and drag-bars connected for operating in conjunction with said axles. I therefore do not claim such a combination, broadly; but What I do claim as my invention, and desire to secure by Letters Patent, is—

1. In a cultivator, the separately-pivoted axles having projecting arms B, in combination with the drag-bars, the rods $d^2$, the rod $d$, and the rod $e$, adjustably connecting the rod $d^2$ to the arms B or the rod $d$, substantially as described.

2. The combination, in a cultivator, of the main frame, a gang of drag-bars, a bracket on the main frame, the drag-bar coupling connected to the bracket and arranged to slide laterally thereon, the rod $d^2$, and the separately-pivoted axles connected to rod $d^2$, substantially as described.

3. The combination, with the cultivator-frame, of drag-bars, the lifting-rods H, levers E, rock-shafts F F′, and the bearing $k$, supporting rock-shaft F, said rock-shaft extending into and forming a bearing for rock-shaft F′, whereby by a pin through perforations in the rock-shafts they may be changed to one continuous shaft, substantially as shown and described.

4. The combination, with the frame and drag-bars, of levers E E, with brackets $h$ and swivels $h^2$, racks G, rock-shafts F F′, lifting-rods H, having a hollow slotted cylinder $g^2$, and spring $g^3$, substantially as shown and described.

In testimony whereof I affix my signature in presence of two witnesses.

WALTER E. TAFT.

Witnesses:
JNO. H. WHALEN,
ANSON S. TAYLOR.